United States Patent
Ohishi

(10) Patent No.: US 6,845,018 B2
(45) Date of Patent: Jan. 18, 2005

(54) POWER CIRCUIT AND METHOD FOR CONTROLLING DRIVE AND CONTROL VOLTAGES OF AN IMAGE FORMATION APPARATUS

(75) Inventor: Hiroto Ohishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 10/369,728

(22) Filed: Feb. 21, 2003

(65) Prior Publication Data

US 2003/0185022 A1 Oct. 2, 2003

(30) Foreign Application Priority Data

Feb. 22, 2002 (JP) ........................................ 2002-046573
Jan. 30, 2003 (JP) ........................................ 2003-022740

(51) Int. Cl.[7] ............................................. H02M 3/335
(52) U.S. Cl. .................................................. 363/21.06
(58) Field of Search ........................... 363/21.06, 21.14, 363/127

(56) References Cited

U.S. PATENT DOCUMENTS

| | | | | | |
|---|---|---|---|---|---|
| 5,424,932 A | * | 6/1995 | Inou et al. ................ | 363/21.06 |
| 5,619,403 A | * | 4/1997 | Ishikawa et al. ......... | 363/21.06 |
| 5,726,869 A | * | 3/1998 | Yamashita et al. ....... | 363/21.06 |
| 5,973,939 A | * | 10/1999 | Tan .......................... | 363/21.06 |
| 6,130,828 A | * | 10/2000 | Rozman .................... | 363/21.06 |
| 6,295,214 B1 | * | 9/2001 | Matsumoto et al. ...... | 363/21.01 |
| 6,297,970 B2 | * | 10/2001 | Hemena et al. .......... | 363/21.06 |
| 6,330,169 B2 | * | 12/2001 | Mullett et al. ............ | 363/16 |
| 6,414,861 B1 | * | 7/2002 | Matsumoto et al. ....... | 363/56.1 |
| 6,452,367 B2 | * | 9/2002 | Watanabe .................. | 323/267 |
| 6,459,594 B1 | * | 10/2002 | Tsuji et al. ............... | 363/21.08 |
| 6,490,178 B1 | * | 12/2002 | Asayama ................... | 363/21.06 |
| 6,531,689 B2 | | 3/2003 | Ohishi et al. ............. | 219/661 |
| 6,597,588 B2 | * | 7/2003 | Matsumoto ................ | 363/21.08 |

FOREIGN PATENT DOCUMENTS

JP    5-333636    12/1993

* cited by examiner

Primary Examiner—Jeffrey Sterrett
(74) Attorney, Agent, or Firm—Oblon, Spivak, McClelland, Maier & Neustadt, P.C.

(57) ABSTRACT

Synchronous rectifier circuits are provided for each secondary windings of a transformer. Field-effect transistors of which ON voltage is lower than the forward voltage of a diode are provided in each of the synchronous rectifier circuits. In an energy saving mode, the field-effect transistors in the synchronous rectifier circuit that outputs a diving voltage are turned OFF. A comparator circuit outputs a signal corresponding to a difference between a control voltage output from one of the synchronous rectifier circuits and a reference voltage. Based on this signal, a pulse-width modulation control circuit ON/OFF controls a field-effect transistor provided corresponding to a primary winding of a transformer in such a manner that the control voltage the reference control voltage attain predetermined levels.

13 Claims, 5 Drawing Sheets

POWER CIRCUIT AND METHOD FOR CONTROLLING DRIVE AND CONTROL VOLTAGES OF AN IMAGE FORMATION APPARATUS

BACKGROUND OF THE INVENTION

1) Field of the Invention

The present invention relates to a power circuit that supplies a power source voltage to an image formation apparatus and a method of controlling a power source of an image formation apparatus.

2) Description of the Related Art

In recent years, there is a great demand to prevent the global warming for global environmental protection. In compliance with this requirement, serious considerations are given to conditions of energy saving, resource saving, and recycling at the time of operating and manufacturing various kinds of products. Among various conditions, the Energy Star proposed by the U.S. Environmental Protection Agency is introduced into Japan as an international power-saving prescription. In Japan, following the results of the conference on the prevention of global warming, Ministry of Economy, Trade and Industry (METI) announced a criterion of energy saving as the law concerning the Rational Use of Energy to be applied to specific devices such as copying machines, home electric appliances, and computers, and presented energy consumption efficiency targets in 2006.

The Energy Star is also reflected to the environmental regulations in the German Environmental Control BAM (Blue Angel Mark), the Nordic Swan Label, and the Swiss Energy 2000.

Based on a rapid spreading of image formation apparatuses into various fields in recent years, it is known that the waiting times of the image formation apparatuses such as printers and copying machines are longer than their operating times. Particularly, more than 90% of the time spent for printers of personal computers is said to be the waiting time. This started the prescription of the Energy Star.

In order to decrease unnecessary power consumption during the waiting time, an image formation apparatus disclosed in Japanese Patent Application Laid-Open No. 5-333636 proposes to use a switching-type power circuit for the power source of the image formation apparatus. This power circuit stops power supply to sections of the image formation apparatus that do not require power supply during the waiting time.

This type of conventional power circuit of an image formation apparatus is structured as shown in FIG. 6. A rectifier circuit 21 is connected to a first secondary winding 25a of a transformer 13, and a rectifier circuit 22 is connected to a second secondary winding 25b of a transformer 13. Driving output terminals td1 and td2 are provided as output terminals of the rectifier circuit 21 via a field-effect transistor (FET) 23. The field effect transistor 23 functions as a switching element. Driving sections that do not require a power supply during the waiting time such as a motor and a solenoid of the image formation apparatus not shown are connected to the driving output terminals td1 and td2. During the normal operation, a driving signal of 24-volts for driving the driving sections is output from the driving output terminals td1 and td2.

The rectifier circuit 22 is connected to the second secondary winding 25b of the transformer 13, as described above. Control output terminals tc1 and tc2 that output a control voltage of 5-volts to control circuits of a CPU (Central Processing Unit) and the like of the image formation apparatus are provided as output terminals of the rectifier circuit 22. A detecting circuit 10 that detects the output voltage is connected to the control output terminals tc1 and tc2.

A comparator circuit 11 that compares a detection voltage of the detecting circuit 10 with a preset reference voltage is connected to an output terminal of the detecting circuit 10. A pulse-width modulation (PWM) control circuit 18 that controls a pulse width modulation is connected to an output terminal of the comparator circuit 11. An output terminal of the pulse-width modulation control circuit 18 is connected to a gate of a field-effect transistor 8 that is insertion connected to a primary winding 24 of the transformer 13 as a switching element. An output terminal of an ON/OFF control circuit 15 is connected to a gate of the field-effect transistor 23.

In the power circuit having the above-described structure, the driving sections of the image formation apparatus are connected to the driving output terminals td1 and td2. The control circuits of a central processing unit (CPU) and the like of the image formation apparatus are connected to the control output terminals tc1 and tc2. When the driving voltage and the control voltage are supplied to the image formation apparatus, the image formation apparatus carries out an image formation operation in the normal operation mode.

In the normal operation mode, the field-effect transistor 23 is ON based on the output signal from the ON/OFF control circuit 15. When an alternating current (AC) voltage input through input terminals t1 and t2 is supplied to the primary winding 24 of the transformer 13, the rectifier circuit 21 rectifies a secondary voltage induced to the first secondary winding 25a of the transformer 13 so that a driving voltage of 24-volt, for example, is supplied to the image formation apparatus via the driving output terminals td1 and td2. Moreover, the rectifier circuit 22 rectifies a secondary voltage induced to the second secondary winding 25b of the transformer 13 so that a control voltage of 5-volt, for example, is supplied to the image formation apparatus via the control output terminals tc1 and tc2.

In the normal operation mode, the detecting circuit 10 detects the control voltages output to the control output terminals tc1 and tc2, and the comparator circuit 11 compares the detection voltages of the detecting circuit 10 with the reference voltage set in advance. Based on a result of the comparison, the pulse-width modulation control circuit 18 carries out a pulse-width modulation control in the primary winding 24 of the transformer 13 so that the control voltages from the control output terminals tc1 and tc2 become a predetermined voltage according to the control signal input to the gate of the field-effect transistor 8. Based on this pulse-width modulation control, the driving voltages output from the driving output terminals td1 and td2 are also controlled to become a predetermined voltage set in advance.

When a predetermined time set in advance elapses after the image formation apparatus ends the image formation in the normal operation mode, an energy saving signal F5 is generated based on the setting of the energy saving mode. This energy saving signal F5 is input to the ON/OFF control circuit 15. The field-effect transistor 23 becomes OFF based on the output signal from the ON/OFF control circuit 15, and interrupts the supply of the driving voltages to the driving sections that do not require power supply during the waiting time.

When a predetermined key operation is carried out or when there is an input of a printing signal, the setting of the operation mode returns from the energy saving mode to the normal operation mode. Based on the setting of the normal operation mode, the input of the energy saving signal F5 to the ON/OFF control circuit 15 is interrupted. Based on the output signal from the ON/OFF control circuit 15, the field-effect transistor 23 becomes ON, and the supply of the driving voltages from the driving output terminals td1 and td2 to the driving sections of the image formation apparatus is started. As a result, the image formation apparatus can carries out the image formation.

However, the driving sections of the motor and the solenoid of the image formation apparatus require at least 5 to 10 amperes. The field-effect transistor 8 is ON during both the normal operation mode and the energy saving mode, and the rectifier circuits 21 and 22 are ON during the normal operation mode. Therefore, the field-effect transistor 8 and the rectifier circuits 21 and 22 have substantially large power loss. Further, in order to restrict a rise in voltage when the driving output terminals td1 and td2 have no current load after ending the image formation operation, it is necessary to connect a dummy resistor R to the driving output terminals. Power consumption of the dummy resistor R lowers the energy saving efficiency during the waiting time of the image formation apparatus.

SUMMARY OF THE INVENTION

It is an object of the present invention to at least solve the problems in the conventional technology.

The power circuit that supplies a power voltage to an image formation apparatus according to one aspect of the present invention comprises a transformer having a primary winding and a plurality of secondary windings and a first switching element connected to the primary winding, wherein the transformer boosts a voltage input from the primary winding and outputs the voltage boosted from each of the secondary windings; a synchronous rectifying unit having a second switching element, wherein the synchronous rectifying unit is connected to the secondary windings, rectifies the voltage output from each of the secondary windings, and outputs the voltage rectified as a driving voltage from two driving output terminals; a rectifying unit that is connected to each of the secondary windings, rectifies the voltage output from each of the secondary windings, and outputs the voltage rectified as a control voltage from two control output terminals; a pulse-width modulation control unit that calculates a difference between the control voltage and a reference voltage, and pulse-width modulation controls the primary winding based on the difference in such a manner that the driving voltage and the control voltage attain predetermined voltage levels; and a synchronous rectification control unit that ON/OFF controls the second switching element according to an operation mode.

The method of controlling a power supply to an image formation apparatus according to another aspect of the present invention comprises a driving-voltage output step in which a synchronous rectifying unit rectifies a boosted voltage input from a transformer, and outputs the voltage rectified as a driving voltage from two driving output terminals; a control-voltage output step in which a rectifying unit rectifies the boosted voltage input from the transformer, and outputs the voltage rectified as a control voltage from two control output terminals; a detecting step in which a detecting unit detects the control voltage output from the control output terminals; a pulse-width modulation control step in which a pulse-width modulation control unit calculates a difference between the control voltage detected with a reference voltage, and pulse-width modulation controls a primary winding of the transformer based on the difference in such a manner that the driving voltage and the control voltage attain predetermined voltage levels; and a synchronous rectification control step in which a synchronous rectification control unit ON/OFF controls a switching element of the synchronous rectifying unit according to an operation mode.

These and other objects, features and advantages of the present invention are specifically set forth in or will become apparent from the following detailed descriptions of the invention when read in conjunction with the accompanying drawings.

DETAILED DESCRIPTION

Exemplary embodiments of a power circuit of an image formation apparatus and a method of controlling the power source of the image formation apparatus according to the present invention is explained in detail below in order with reference to the accompanying drawings.

Figure 1:
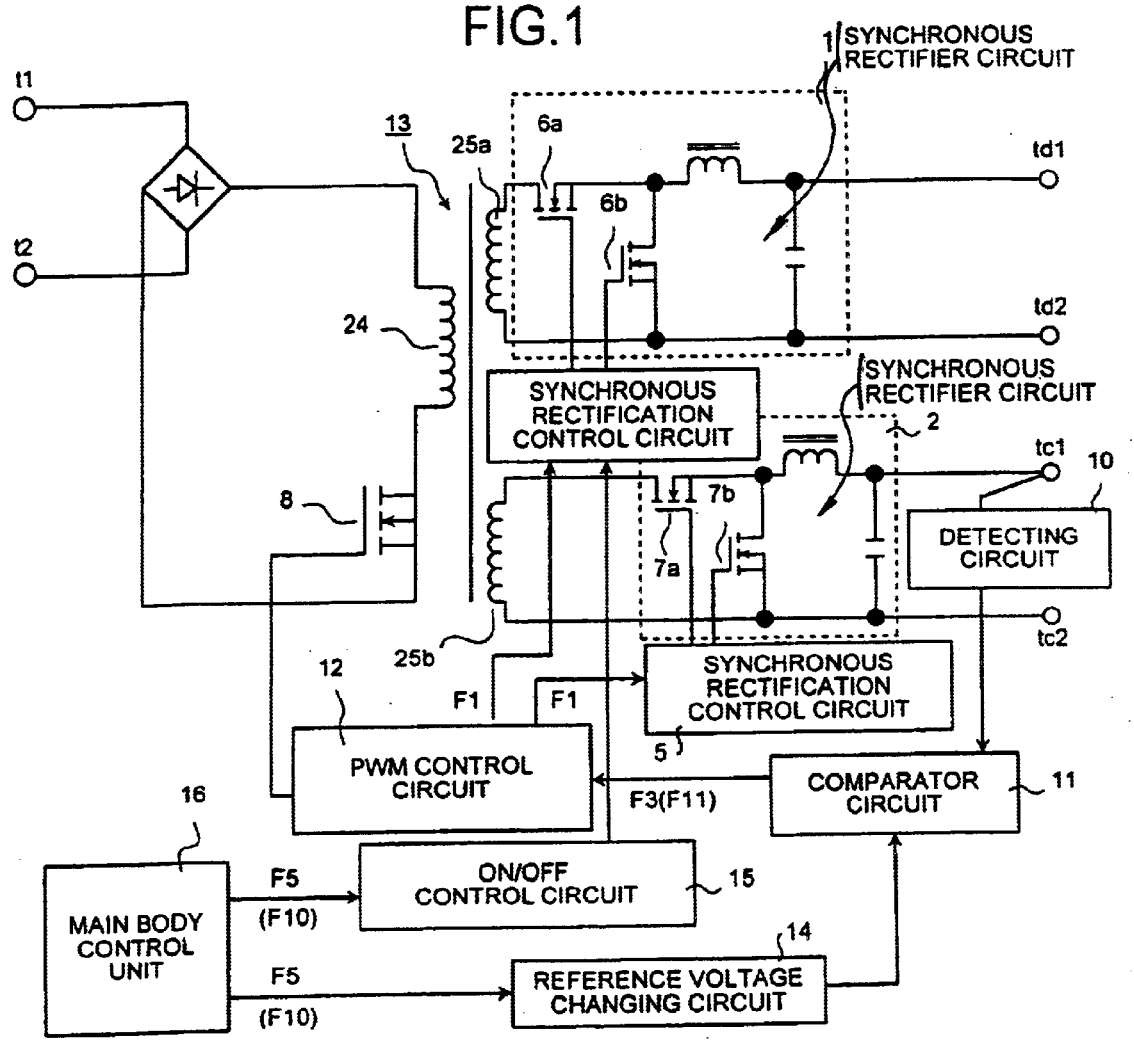
FIG. 1 is a circuit diagram that shows a structure of a power circuit of an image formation apparatus according to a first embodiment of the present invention.
Figure 2:
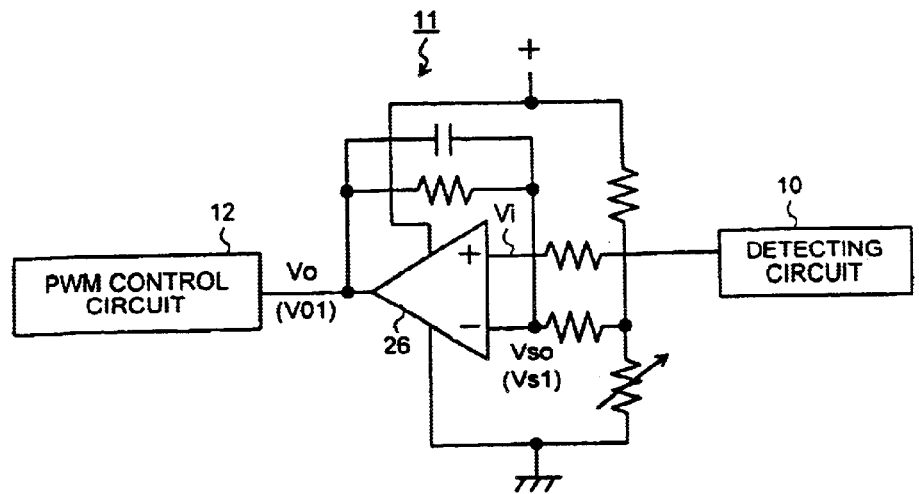
FIG. 2 is a circuit diagram that shows a structure of a comparator circuit shown in FIG. 1.

The power circuit of the image formation apparatus according to a first embodiment of the present invention is shown in FIG. 1 and FIG. 2. FIG. 1 is a circuit diagram that shows a structure of the power circuit of the image formation apparatus according to the first embodiment, and FIG. 2 is a circuit diagram that shows a structure of a comparator circuit shown in FIG. 1.

Figure 6:
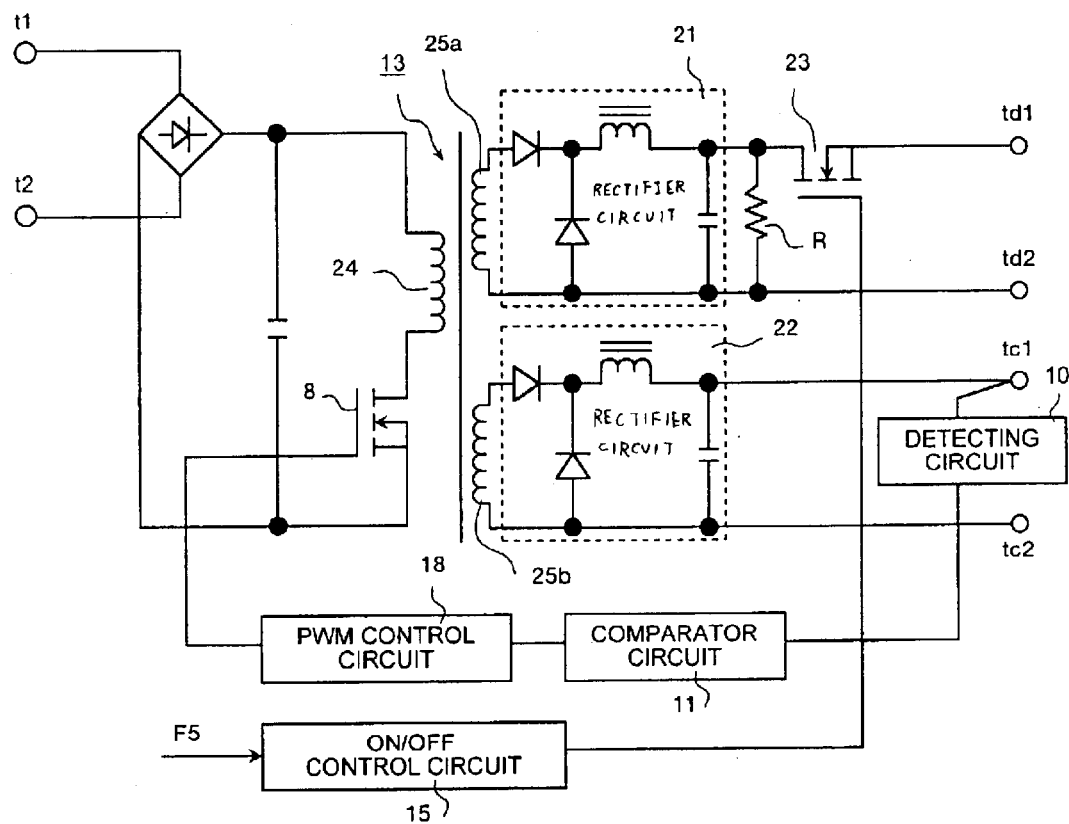
FIG. 6 is a circuit diagram that shows a structure of a conventional power circuit of an image formation apparatus.

As shown in FIG. 1, the power circuit of the image formation apparatus according to the first embodiment comprises: the transformer 13 that boosts a voltage input from the primary winding 24 thereof; the field-effect transistor 8 connected in series with the primary winding 24 of the transformer 13, and that switches the transformer 13; a first synchronous rectifier circuit 1 connected to the first secondary winding 25a of the transformer 13, rectifies the secondary voltage thereof, and outputs driving voltages (of a 24-volt system) from the driving output terminals td1 and td2; a second synchronous rectifier circuit 2 connected to the second secondary winding 25b of the transformer 13, rectifies the secondary voltage thereof, and outputs control voltages (of a 5-volt system) from the control output terminals tc1 and tc2; a synchronous rectification control circuit 3 that controls the switching of field-effect transistors 6a and 6b of the first synchronous rectifier circuit 1 according to the operation mode; a synchronous rectification control circuit 5 that controls the switching of field-effect transistors 7a and 7b of the second synchronous rectifier circuit 2; the detecting circuit 10 that detects a control voltage output from the control output terminal tc1 of the second synchronous rectifier circuit 2; the comparator circuit 11 that compares the control voltage detected by the detecting circuit 10 with a reference voltage, and outputs a differential signal; a pulse-width modulation control circuit 12 that pulse-width modulation controls the switching of the field-effect transistor 8 based on the differential signal input from the comparator circuit 11; a reference voltage changing circuit 14 that changes the reference voltage of the comparator circuit 11; the ON/OFF control circuit 15 that outputs a control signal to the synchronous rectification control circuit 3 according to the operation mode; and a main body control unit 16 that outputs a command signal corresponding to the operation mode of the image formation apparatus to the ON/OFF control circuit 15 and the reference voltage changing circuit 14. In the figures, same reference numerals have been attached to those components that perform same or similar functions as the components shown in FIG. 6.

The synchronous rectifier circuit 1 has the field-effect transistors 6a and 6b. These field-effect transistors 6a and 6b function as switching elements. Input terminals of the synchronous rectifier circuit 1 is connected to the first secondary winding 25a of the transformer 13. The driving output terminals td1 and td2 are the output terminals of the synchronous rectifier circuit 1. The synchronous rectification control circuit 3 that ON/OFF controls the synchronous rectifier circuit 1 is connected to gates of the field-effect transistors 6a and 6b.

The synchronous rectifier circuit 2 has the field-effect transistors 7a and 7b. These field-effect transistors 7a and 7b functions as switching elements. Input terminals of the synchronous rectifier circuit 2 is connected to the second secondary winding 25b of the transformer 13. The control output terminals tc1 and tc2 are output terminals of the synchronous rectifier circuit 2. The synchronous rectification control circuit 5 that ON/OFF controls the synchronous rectifier circuit 2 is connected to gates of the field-effect transistors 7a and 7b.

Further, the detecting circuit 10 that detects control voltages output from the control output terminals tc1 and tc2 is provided. The comparator circuit 11 that compares the detected control voltages with the reference voltage and outputs a differential signal (i.e., a comparison signal) is connected to an output terminal of the detecting circuit 10.

As shown in FIG. 2, the comparator circuit 11 has a differential amplifier 26. The reference voltage changing circuit 14 changes the reference voltage. The pulse-width modulation control circuit 12 that carries out the pulse-width modulation control is connected to an output terminal of the comparator circuit 11. An output terminal of the pulse-width modulation control circuit 12 is connected to a gate of the field-effect transistor 8 as a switching element connected in series with the primary winding 24 of the transformer 13. A control terminal of the pulse-width modulation control circuit 12 is connected to control terminals of the synchronous rectifier circuits 3 and 5 respectively.

The main body control unit 16 outputs a command signal corresponding to the operation mode of the image formation apparatus (i.e., the energy saving signal F5 when the energy saving mode is set, and an energy saving cancellation signal F10 when the energy saving mode is cancelled). The main body control unit 16 is provided at the outside of the power circuit. The ON/OFF control circuit 15 is connected to a first output terminal of the main body control unit 16, and an output terminal of the ON/OFF control circuit 15 is connected to a control terminal of the synchronous rectification control circuit 3. The reference voltage changing circuit 14 that changes the reference voltage is connected to a second output terminal of the main body control unit 16, and an output terminal of the reference voltage changing circuit 14 is connected to the comparator circuit 11.

The power circuit operates as explained below. In the normal operation mode of carrying out the image formation operation, a driving voltage of 24-volt output from the driving output terminals td1 and td2 is supplied as driving power sources to the driving sections of the motor and the solenoid of the image formation apparatus that are connected to the driving output terminals td1 and td2. A control voltage of 5-volt output from the control output terminals tc1 and tc2 is supplied as a control power source to the control circuits of the CPU and the like of the image formation apparatus that are connected to the control output terminals tc1 and tc2. The control voltage of 5-volt is output in the stabilization accuracy of 1 to 2%, and the power source voltage of 24-volt is output in the stabilization accuracy of approximately 10%.

In the normal operation mode, the detecting circuit 10 detects the control voltages of the control output terminals tc1 and tc2, and outputs a detection voltage Vi to a non inverting input terminal of the differential amplifier 26 of the comparator circuit 11. The differential amplifier 26 compares the detection voltage Vi input to the non inverting input terminal with a reference voltage Vso set in advance in an inverting input terminal, and outputs a voltage Vo=Vi−Vso (i.e., a differential signal) to the pulse-width modulation control circuit 12. The pulse-width modulation control circuit 12 outputs the control signal based on the voltage Vo (i.e., the differential signal) output to the gate of the field-effect transistor 8, thereby to ON/OFF control the field-effect transistor 8. The pulse-width modulation control circuit 12 outputs a synchronous control signal F1 that is synchronous with this control signal, to the synchronous rectification control circuits 3 and 5 respectively.

The synchronous rectification control circuit 3 ON/OFF controls the field-effect transistors 6a and 6b of the synchronous rectifier circuit 1 in synchronism with the field-effect transistor 8 based on the synchronous control signal F1 input from the pulse-width modulation control circuit 12. Similarly, the synchronous rectification control circuit 5 ON/OFF controls the field-effect transistors 7a and 7b of the synchronous rectifier circuit 2 in synchronism with the field-effect transistor 8 based on the synchronous control signal F1 input from the pulse-width modulation control circuit 12. As explained above, in the normal operation mode, the field-effect transistor 8, the field-effect transistors 6a and 6b of the synchronous rectifier circuit 1, and the field-effect transistors 7a and 7b of the synchronous rectifier circuit 2 are ON/OFF controlled synchronously.

As explained above, in the normal operation mode, the pulse-width modulation control circuit 12 carries out a pulse-width modulation feedback control so that the control output terminals tc1 and tc2 output the control voltages of 5-volt. In response to this, the driving output terminals td1 and td2 output the driving voltages of 24-volt. The control voltages output from the control output terminals tc1 and tc2 are supplied to the control circuits of the CPU and the like of the image formation apparatus. The driving voltages from the driving output terminals td1 and td2 are supplied to the driving sections of the motor and the solenoid of the image formation apparatus. Based on this, the image formation apparatus carries out the image formation.

When a preset predetermined period of time passes after the image formation apparatus ends the image formation operation, the main body control unit 16 sets the energy saving mode, and outputs the energy saving signal F5 to the ON/OFF control circuit 15 and the reference voltage changing circuit 14. Upon receiving the input of the energy saving signal F5, the ON/OFF control circuit 15 outputs the energy saving control signal F3 to the synchronous rectification control circuit 3. Upon receiving the input of the energy saving control signal F3, the synchronous rectification control circuit 3 turns off the field-effect transistors 6a and 6b of the synchronous rectifier circuit 1 based on this control signal. Based on this, the synchronous rectifier circuit 1 is cut off, and the output of the driving voltages from the driving output terminals td1 and td2 is stopped.

Upon receiving the input of the energy saving signal F5 from the main body control unit 16, the reference voltage changing circuit 14 inputs, in place of the reference voltage Vso, an energy saving reference voltage Vs1 that is lower than the reference voltage Vso, to the non inverting input terminal of the differential amplifier 26 of the comparator circuit 11. As a result, the comparator circuit 11 outputs a voltage Vo1 of a signal (i.e., a differential signal) based on Vi–Vs1, and inputs this voltage Vo1 to the pulse-width modulation control circuit 12.

The pulse-width modulation control circuit 12 outputs the control signal based on the output voltage Vo1 (i.e., the differential signal) input from the comparator circuit 11, to the gate of the field-effect transistor 8. The pulse-width modulation control circuit 12 pulse-width modulation controls the ON/OFF of the field-effect transistor 8 at the primary winding 24 of the transformer 13 so that the control voltages output from the control output terminals tc1 and tc2 become the energy saving control voltages lower than the reference control voltage.

The reference voltage changing circuit 14 can set the energy saving reference voltage Vs1 of the comparator circuit 11 to a lower limit operation voltage of the control circuits connected to the control output terminals tc1 and tc2 or to approximately 90% of the rated voltage of the control circuits.

Based on this, the energy saving control voltages output from the control output terminals tc1 and tc2 are set to the lower limit operation voltage of the control circuits of the image formation apparatus connected to the control output terminals tc1 and tc2. Alternatively, the energy saving control voltages are set to approximately 90% of the rated voltage of the control circuits.

On the other hand, when the user sets a draft or carries out a key operation or when the image formation starting instruction is input based on the input of the printing signal, the main body control unit 16 returns from the energy saving mode to the normal operation mode. Specifically, when the main body control unit 16 returns from the energy saving mode to the normal operation mode, the main body control unit 16 outputs the energy saving cancellation signal F10 to the ON/OFF control circuit 15 and the reference voltage changing circuit 14.

Upon receiving the input of the energy saving cancellation signal F10 from the main body control unit 16, the ON/OFF control circuit 15 outputs a return signal F11 to the synchronous rectification control circuit 3. Upon receiving the input of the return signal F11 from the ON/OFF control circuit 15, the synchronous rectification control circuit 3 ON/OFF controls the field-effect transistors 6a and 6b of the synchronous rectifier circuit 1 in synchronism with the field-effect transistor 8, and sets the synchronous rectifier circuit 1 to a conductive state.

Upon receiving the input of the energy saving cancellation signal F10 from the main body control unit 16, the reference voltage changing circuit 14 sets the reference voltage Vso to the inverting input terminal of the differential amplifier 26 of the comparator circuit 11. Based on this, the comparator circuit 11 outputs the output voltage Vo of the signal (i.e., the differential signal) based on Vi–Vso, to the pulse-width modulation control circuit 12. The pulse-width modulation control circuit 12 outputs the control signal according to the output voltage Vo input from the comparator circuit 11, to the gate of the field-effect transistor 8. The pulse-width modulation control circuit 12 ON/OFF controls the field-effect transistor 8 at the primary winding 24 of the transformer 13 so that the control voltages output from the control output terminals tc1 and tc2 become the reference control voltage of 5-volt.

Based on the above, the output of the driving voltages of 24-volt is started again from the driving output terminals td1 and td2 via the synchronous rectifier circuit 1 in the secondary winding 25a of the transformer 13. The control voltages output from the control output terminals tc1 and tc2 are supplied to the control circuits of the CPU and the like of the image formation apparatus. The driving voltages from the driving output terminals td1 and td2 are supplied to the driving sections of the motor and the solenoid of the image formation apparatus.

As a result, the image formation apparatus carries out the image formation.

As explained above, according to the first embodiment, the field-effect transistors 6a, 6b, 7a, and 7b, of which ON voltage is lower than the forward voltage of the diode, are used, instead of the diode, as switching elements in the synchronous rectifier circuits 1 and 2. Therefore, in the normal operation mode of carrying out the image formation operation, it is possible to decrease power consumption.

In the energy saving mode set after a lapse of a predetermined time since the end of the normal operation mode, the synchronous rectification control circuit 3 ON/OFF controls the field-effect transistors 6a and 6b of the synchronous rectifier circuit 1. Therefore, it is possible to avoid wasteful power consumption in the field-effect transistors 6a and 6b. As no current flows through the synchronous rectifier circuit 1, it is not necessary to connect a dummy resistor to the driving output terminals td1 and td2. Consequently, it is possible to completely avoid the conventional wasteful power consumption in the dummy resistor.

Further, in the energy saving mode, the comparator circuit 11 carries out the differential calculation based on the energy saving reference voltage Vs1 output from the reference voltage changing circuit 14. Based on the voltage output from the comparator circuit 11, the pulse-width modulation control circuit 12 outputs the control signal to ON/OFF control the field-effect transistor 8 so that the control voltages output from the control output terminals tc1 and tc2 become the energy saving control voltage lower than the reference control voltage. Therefore, in the energy saving mode, it is also possible to lower the control voltages that are supplied to the control circuits of the image formation apparatus. Consequently, it is possible to further decrease power consumption.

In the energy saving mode, the reference voltage changing circuit 24 sets the reference voltage of the comparator circuit 11 to the lower limit operation voltage of the control circuits that are connected to the control output terminals tc1 and tc2. Therefore, it is possible to output the control voltage as the lower limit operation voltage of the control circuits from the control output terminals tc1 and tc2. Consequently, it is possible to set the power consumption during the energy saving mode to the permissible lowest value of the image formation apparatus. As a result, it is possible to achieve a maximum reduction of power consumption.

The reference voltage changing circuit 24 sets the reference voltage of the comparator circuit 11 to approximately 90% of the rated voltage of the control circuits that are connected to the control output terminals tc1 and tc2. Therefore, it is possible to output the control voltage that is approximately 90% of the rated voltage of the control circuits from the control output terminals tc1 and tc2. Consequently, during the energy saving mode, it is possible to decrease power consumption in a state that return reliability sufficient enough to return to the normal operation mode is maintained.

Figure 3:
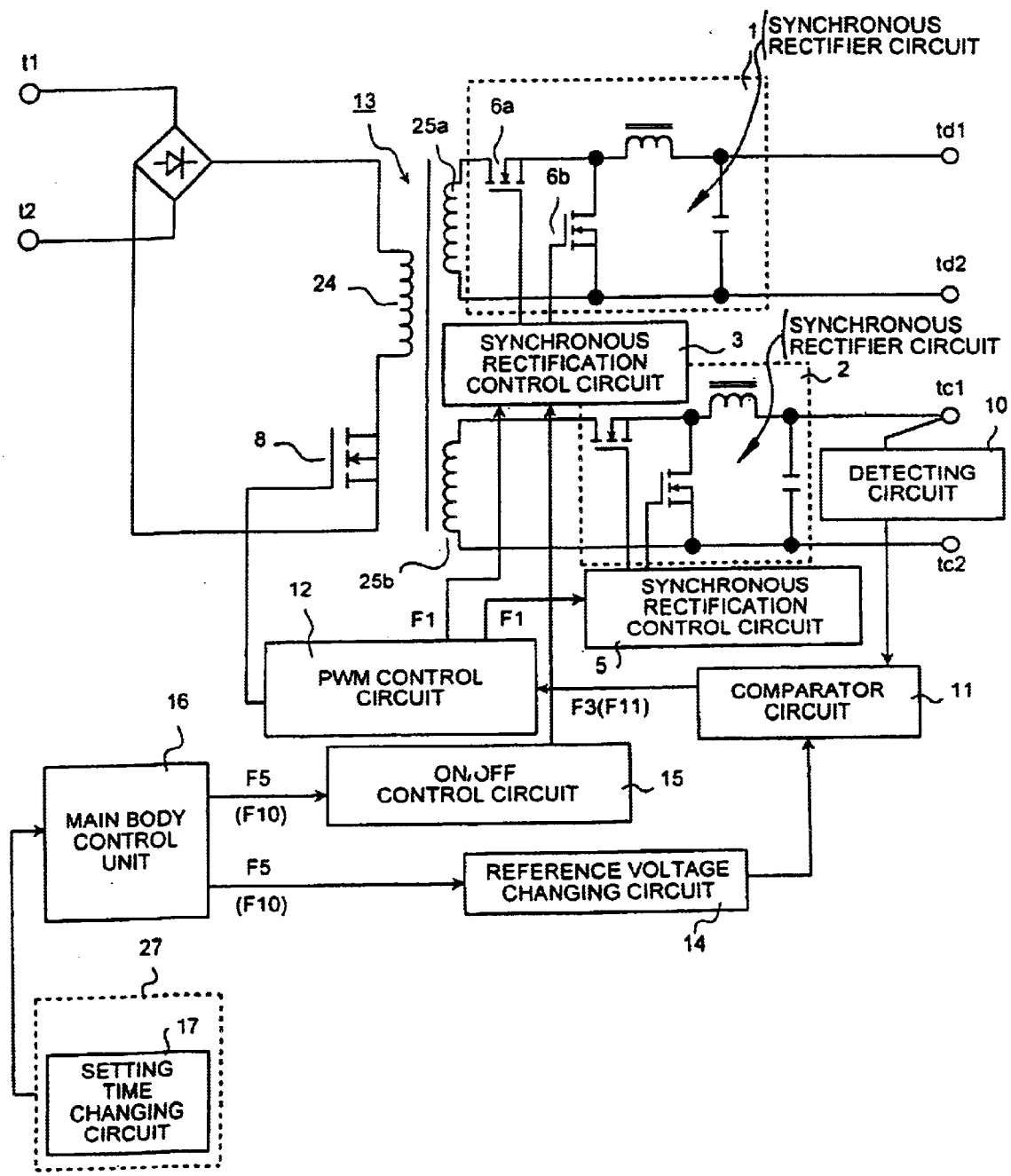
FIG. 3 is a circuit diagram that shows a structure of a power circuit of an image formation apparatus according to a second embodiment of the present invention.

The power circuit of the image formation apparatus according to a second embodiment of the present invention is explained with reference to FIG. 3. In FIG. 3, sections of which structures and functions are equivalent to those in FIG. 1 are attached with like reference numerals.

The power circuit of the image formation apparatus according to the second embodiment has the following additional sections in the structure of the power circuit of the image formation apparatus according to the first embodiment shown in FIG. 1. There is provided a user key operating section 27 that includes a setting time changing circuit 17 that sets a shifting time from the end of the normal operation mode to the setting of the energy saving mode. The user sets a shifting time from the end of the normal operation mode to the setting of the energy saving mode, with the setting time changing circuit 17. The setting time changing circuit 17 outputs a time setting signal corresponding to the set shifting time, to the main body control unit 16. The main body control unit 16 changes the timing of outputting the energy saving signal F5 according to the time setting signal input from the setting time changing circuit 17. With this arrangement, the user can optionally set the shifting time from the end of the normal operation mode to the setting of the energy saving mode.

The structures and operations of other sections are similar to those in the first embodiment, and therefore, their explanation is omitted.

As explained above, according to the second embodiment, the user optionally sets a time from the end of the normal operation mode, in which the image formation apparatus executes the image formation, to the setting of the energy saving mode, based on a using condition. Therefore, it is possible to efficiently decrease power consumption of the image formation apparatus by properly following the using condition.

Figure 4:
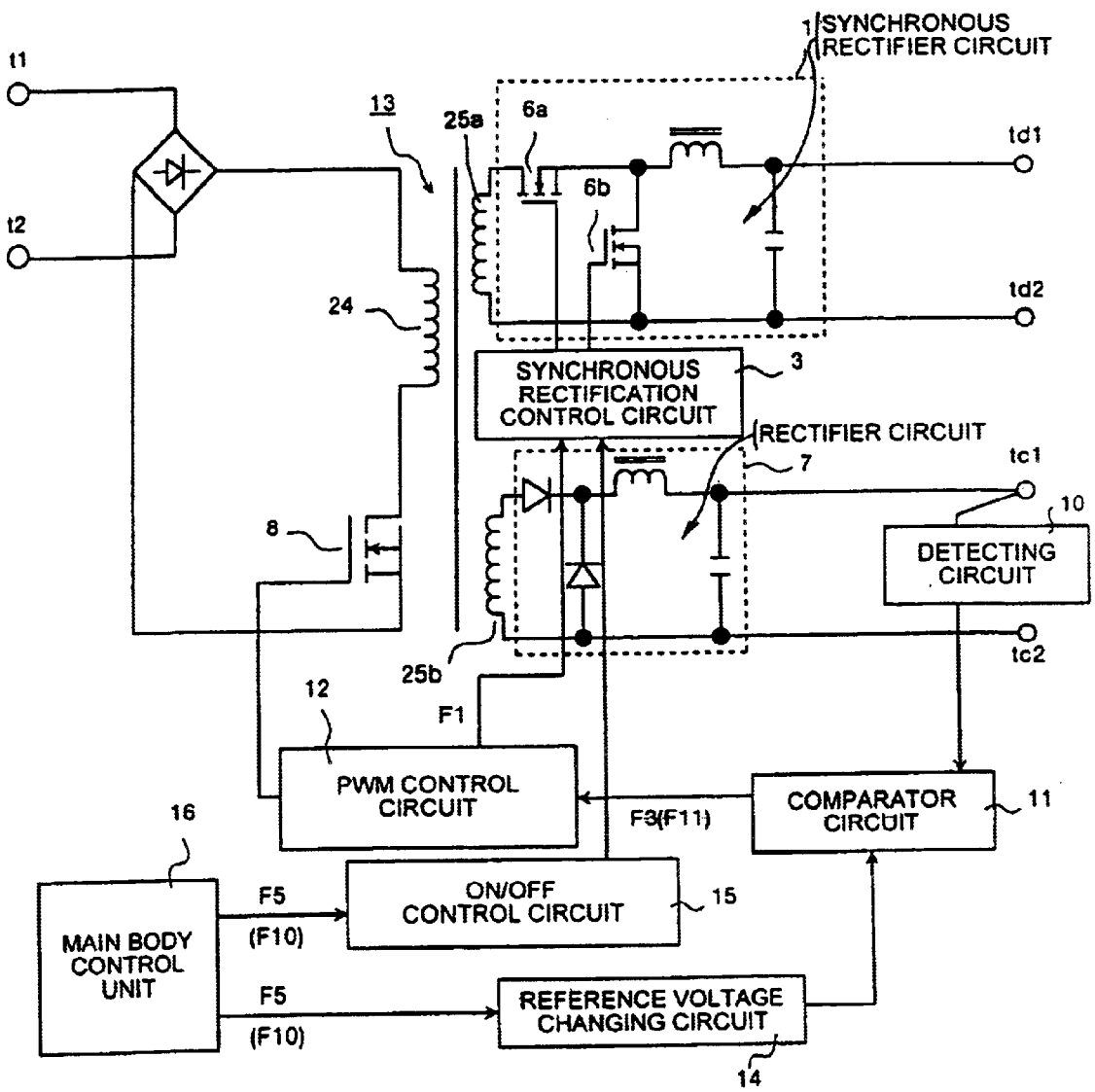
FIG. 4 is a circuit diagram that shows a structure of a power circuit of an image formation apparatus according to a third embodiment of the present invention.

The power circuit of the image formation apparatus according to a third embodiment of the present invention is explained with reference to FIG. 4. In FIG. 4, sections of which structures and functions are equivalent to those in FIG. 1 are attached with like reference numerals.

The power circuit of the image formation apparatus according to the third embodiment has the following arrangement in the power circuit of the image formation apparatus according to the first embodiment shown in FIG. 1. A rectifier circuit 7 is provided in place of the synchronous rectifier circuit 2. The synchronous rectification control circuit 5 is excluded. The structure of the rectifier circuit 7 is similar to that of the rectifier circuit 22 shown in FIG. 6, and therefore, its detailed explanation is omitted.

The structures and operations of other sections are similar to those in the first embodiment, and therefore, their explanation is omitted.

In the third embodiment, the field-effect transistors 6a and 6b of which ON voltage is lower than the forward voltage of the diode, are used, instead of the diode, as switching elements in the synchronous rectifier circuit 1. Therefore, in the normal operation mode of carrying out the image formation operation, it is possible to decrease power consumption.

In the energy saving mode set after a lapse of a predetermined time since the end of the normal operation mode, the synchronous rectification control circuit 3 OFF controls the field-effect transistors 6a and 6b of the synchronous rectifier circuit 1. Therefore, it is possible to avoid wasteful power consumption in the field-effect transistors 6a and 6b. As no current flows through the synchronous rectifier circuit 1, it is not necessary to connect a dummy resistor to the driving output terminals td1 and td2. Consequently, it is possible to completely avoid the conventional wasteful power consumption in the dummy resistor. In the power circuit of the image formation apparatus according to the present invention, it possible to sufficiently decrease power consumption even when the synchronous rectifier circuit is used in only the driving voltage output system.

As the synchronous rectifier circuit 2 is not necessary in the third embodiment, it is possible to simplify the circuit structure from the circuit structure of the first embodiment.

Figure 5:
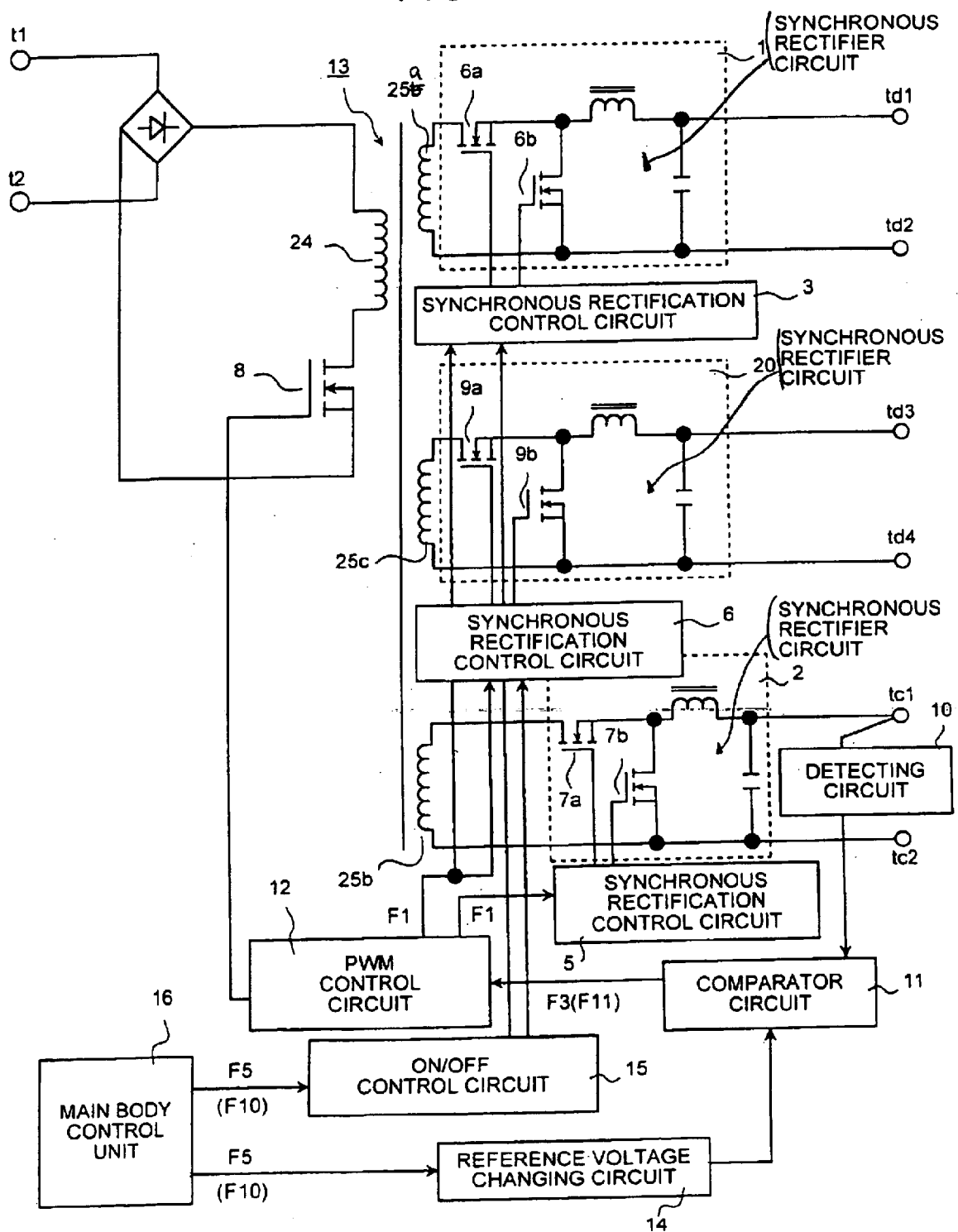
FIG. 5 is a circuit diagram that shows a structure of a power circuit of an image formation apparatus according to a fourth embodiment of the present invention.

The power circuit of the image formation apparatus according to a fourth embodiment of the present invention is explained with reference to FIG. 5. In FIG. 5, sections of which structures and functions are equivalent to those in FIG. 1 are attached with like reference numerals.

The transformer 13 in the power circuit of the image formation apparatus according to the fourth embodiment has three secondary windings, while the transformers 13 in the first to third embodiments have one secondary winding. A third secondary winding 25c has a synchronous rectifier circuit 20 having field-effect transistors 9a and 9b as switching elements, and a synchronous rectification control circuit 6 ON/OFF controls the field-effect transistors 9a and 9b. The structure of the synchronous rectifier circuit 20 is similar to that of the synchronous rectifier circuit 1.

In FIG. 5, an input terminal of the synchronous rectifier circuit 20 having the field-effect transistors 9a and 9b as switching elements, is connected to the third secondary winding 25c of the transformer 13. Driving output terminals td3 and td4 are provided as output terminals of the synchronous rectifier circuit 20. A synchronous rectification control circuit 6 that ON/OFF controls the synchronous rectifier circuit 20 is connected to gates of the field-effect transistors 9a and 9b of the synchronous rectifier circuit 20.

This power circuit operates as explained below. Sections other than the synchronous rectifier circuit 20 and the synchronous rectification control circuit 6 carry out operations similar to those of the corresponding sections in the first embodiment, and therefore, their explanation is omitted. According to the fourth embodiment, in the normal operation mode of carrying out the image formation operation, the driving voltages of 24-volt output from the driving output terminals td1 and td2 are supplied as driving power sources to the driving sections of the motor and the solenoid of the image formation apparatus that are connected to the driving output terminals td1 and td2. Further, the driving voltages of 24-volt output from the driving output terminals td3 and td4 are supplied as driving power sources to cooling fans and the like of the image formation apparatus that are connected to the driving output terminals td3 and td4.

Based on the synchronous control signal F1 from the pulse-width modulation control circuit 12, the synchronous rectification control circuit 6 ON/OFF controls the field-effect transistors 9a and 9b of the synchronous rectifier circuit 20 connected to the third secondary winding 25c, in synchronism with the field-effect transistor 8.

The driving output terminals td3 and td4 output the driving voltages of 24-volt. The driving voltages from the driving output terminals td1 and td2 are supplied to the cooling fans and the like of the image formation apparatus.

When the image formation apparatus ends the image formation operation, the main body control unit 16 set the energy saving mode, and outputs the energy saving signal F5 to the ON/OFF control circuit 15 and the reference voltage changing circuit 14. Upon receiving the input of the energy saving signal F5, the ON/OFF control circuit 15 outputs the energy saving control signal F3 to the synchronous rectification control circuit 3. Upon receiving the input of the energy saving control signal F3 from the ON/OFF control circuit 15, the synchronous rectification control circuit 3 turns off the field-effect transistors 6a and 6b of the synchronous rectifier circuit 1 based on this control signal. Based on this, the synchronous rectifier circuit 1 is cut off, and the output of the driving voltages from the driving output terminals td1 and td2 is stopped.

The ON/OFF control circuit 15 receives an input of the energy saving signal F5, and after a lapse of a predetermined time, outputs the energy saving control signal F3 to the synchronous rectification control circuit 6. Upon receiving the input of the energy saving control signal F3 from the ON/OFF control circuit 15, the synchronous rectification control circuit 6 turns off the field-effect transistors 9a and 9b of the synchronous rectifier circuit 20 based on this control signal. Based on this, the synchronous rectifier circuit 20 is cut off, and the output of the driving voltages from the driving output terminals td3 and td4 is stopped.

When the image formation apparatus returns from the energy saving mode to the normal operation mode, the main body control unit 16 outputs the energy saving cancellation signal F10 to the ON/OFF control circuit 15 and the reference voltage changing circuit 14.

Upon receiving the input of the energy saving cancellation signal F10 from the main body control unit 16, the ON/OFF control circuit 15 outputs the return signal F11 to the synchronous rectification control circuit 3 and the synchronous rectification control circuit 6. Upon receiving the input of the return signal F11 from the ON/OFF control circuit 15, both the synchronous rectification control circuits 3 and 6 ON/OFF control the field-effect transistors 6a and 6b of the synchronous rectifier circuit 1 and the field-effect transistors 9a and 9b of the synchronous rectifier circuit 20 respectively, in synchronism with the field-effect transistor 8 based on the synchronous control signal F1 from the pulse-width modulation control circuit 12. The synchronous rectification control circuits 3 and 6 set the synchronous rectifier circuits 1 and 20 to a conductive state.

In the fourth embodiment, structures and operations of other sections are similar to those in the first embodiment, and therefore, their explanation is omitted.

As explained above, according to the fourth embodiment, the power circuit has two driving-voltage output systems. In the energy saving mode, the synchronous rectifier circuit 1 is set to the non-conductive state, and after a lapse of a predetermined time, the synchronous rectifier circuit 20 is set to the non-conductive state. Therefore, it is possible to achieve both the reduction in power consumption and the proper power source control according to the load. It is possible to achieve this because the cooling fans need to operate for some period of time even after ending the image formation operation, but other driving sections do not need to operate after ending the image formation operation.

The present invention is not limited to the above embodiments, and it is also possible to achieve the present invention by suitably modifying the embodiments within the range not deviating from the gist of the invention.

According to a first aspect of the present invention, it is possible to lower the ON voltage of the switching element than the forward voltage of the diode. Further, by ON/OFF controlling the switching element of the synchronous rectifying unit according to the operation mode, it is possible to lower the power consumption of the synchronous rectifying unit. As a result, it is possible to provide a power circuit of an image formation apparatus that can decrease power consumption.

According to a second aspect of the present invention, in the energy saving mode, the synchronous rectifying unit is set to a cut-off state, and no current flows to the secondary winding of the transformer to which the synchronous rectifying unit is connected. A connection of a dummy resistor to the driving output terminal is not necessary. Therefore, it is possible to decrease wasteful power consumption during the period while the image formation operation is stopped.

According to a third aspect of the present invention, in the energy saving mode, the control voltage output from the control output terminal is set lower than the control voltage in the normal operation mode, and it is possible to lower the current flowing to the synchronous rectifying unit. Therefore, it is possible to lower wasteful power consumption during the period while the image formation operation is stopped.

According to a fourth aspect of the present invention, during the energy saving mode, it is possible to set power consumption to a permissible lowest value of the image formation apparatus, thereby to achieve a maximum power reduction.

According to a fifth aspect of the present invention, during the energy saving mode, it is possible to decrease power consumption in a state that return reliability sufficient enough to return to the normal operation mode is maintained.

According to a sixth aspect of the present invention, it is possible to efficiently execute the image formation operation by adjusting the time from the end of the normal operation mode to the setting of the energy saving mode, according to a user's using condition.

According to a seventh aspect of the present invention, it is possible to achieve both the reduction in power consumption and the proper power source control according to the load, by using the two driving voltage output systems.

The present document incorporates by reference the entire contents of Japanese priority documents, 2002-046573 filed in Japan on Feb. 22, 2002 and 2003-022740 filed in Japan on Jan. 30, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A power circuit that supplies a power voltage to an image formation apparatus, comprising:
   a transformer having a primary winding, a plurality of secondary windings, and a first switching element connected to the primary winding, the transformer configured to input a primary voltage of the primary winding and to output respective secondary voltages from each of the secondary windings;
   a synchronous rectifying unit including a second switching element the synchronous first rectifying unit connected to one of the secondary windings, the synchronous first rectifying unit configured to rectify the secondary voltage of the one of the secondary windings and to output a driving voltage;
   a second rectifying unit connected to another of the secondary windings, the second rectifying unit configured to rectify the secondary voltage of the another of the secondary windings and to output a control voltage;
   a pulse-width modulation control unit configured to control the primary winding based on a difference between the control voltage and a reference voltage, such that the driving voltage and the control voltage attain respective predetermined voltage levels; and
   a synchronous rectification control unit configured to control the second switching element according to an operation mode,
   wherein, when the operation mode is a normal operation mode in which the image formation apparatus carries out image formation, the synchronous rectification control unit switches the second switching element to set the first synchronous rectifying unit to an electrically conducting state whereby the driving voltage is output, and
   when the operation mode is an energy saving mode in which the image formation apparatus is in a waiting state, the synchronous rectification control unit switches the second switching element to set the synchronous first rectifying unit to an electrically non-conducting state whereby the driving voltage is not output.

2. The power circuit according to claim 1, wherein the second rectifying unit is a synchronous rectifier circuit including a switching element.

3. The power circuit according to claim 1, further comprising a reference voltage changing unit that changes the reference voltage,
   wherein in the energy saving mode, the reference voltage changing unit sets the reference voltage to a lower level than a level during the normal operation mode.

4. The power circuit according to claim 3, wherein in the energy saving mode, the reference voltage changing unit sets the reference voltage to a level that is a lowest voltage required for operation of a control circuit connected to a control output terminal configured to output the control voltage.

5. The power circuit according to claim 3, wherein in the energy saving mode, the reference voltage changing unit sets the reference voltage to greater than or equal to 90% of a rated voltage of a control circuit connected to a control output terminal configured to output the control voltage.

6. The power circuit according to claim 1, further comprising a time setting unit that sets a time duration after which the normal operation mode is shifted to the energy saving mode after ending the image formation operation.

7. The power circuit according to claim 1, wherein the second rectifying unit is a synchronous rectifying unit, and
   the synchronous rectification control unit switches switching elements in each of the first and second synchronous rectifying units according to the operation mode.

8. A method of supplying a power voltage to an image formation apparatus, comprising:
   converting a primary voltage of a primary winding to respective secondary voltages of secondary windings;
   rectifying the secondary voltage of one of the secondary windings and outputting a driving voltage;
   rectifying the secondary voltage of another of the secondary windings and outputting a control voltage;
   controlling the primary winding based on a difference between the control voltage and a variable reference voltage, such that the driving voltage and the control voltage attain respective predetermined voltage levels; and
   switching, based on an operation mode, a second switching element connected to the one of the secondary windings.

9. A power circuit that supplies a power voltage to an image formation apparatus, comprising:
   a transformer including a primary winding, a plurality of secondary windings, and a first switching element connected to the primary winding, the transformer configured to input a primary voltage of the primary winding and to output respective secondary voltages from each of the secondary windings;
   a synchronous first rectifying unit including a second switching element, the synchronous first rectifying unit connected to one of the secondary windings, the synchronous first rectifying unit configured to rectify the secondary voltage of the one of the secondary windings and to output a driving voltage;
   a second rectifying unit connected to another of the secondary windings, the second rectifying unit configured to rectify the secondary voltage of the another of the secondary windings and to output a control voltage;
   a pulse-width modulation control unit configured to control the primary winding based on a difference between the control voltage and a variable reference voltage, such that the driving voltage and the control voltage attain respective predetermined voltage levels; and
   a synchronous rectification control unit configured to control the second switching element according to an operation mode.

10. The power circuit according to claim 9, further comprising:
    a reference voltage changing unit that changes the reference voltage depending on a normal mode in which the image formation apparatus carries out image formation or an energy saving mode in which the image formation apparatus is in a waiting state,
    wherein, in the energy saving mode, the synchronous rectification control unit switches the synchronous first rectifying unit to an electrically non-conducting state, the pulse-width modulation control unit processes the control voltage output from a control output terminal based on an energy saving mode reference voltage differing from a normal mode reference voltage, and the control voltage decreases to a level lower than a reference control voltage.

11. A method of supplying a power voltage to an image formation apparatus, comprising:

converting a primary voltage of a primary winding to respective secondary voltages of secondary windings;

rectifying the secondary voltage of one of the secondary windings and outputting a driving voltage;

rectifying the secondary voltage of another of the secondary windings and outputting a control voltage;

controlling the primary winding based on a difference between the control voltage and a reference voltage, such that the driving voltage and the control voltage attain respective predetermined voltage levels; and switching a second switching element connected to the one of the secondary windings, such that (1) during a normal operation mode in which the image formation apparatus carries out image formation, the driving voltage is output, and (2) during an energy saving mode in which the image formation apparatus is in a waiting state, the driving voltage is not output.

12. The method according to claim 11, further comprising:

setting a time duration after which the normal operation mode is shifted to the energy saving mode after ending the image formation operation.

13. The method according to claim 11, further comprising:

setting the reference voltage to a lower level in the energy saving mode than the reference voltage in the normal operation mode.

* * * * *